UNITED STATES PATENT OFFICE.

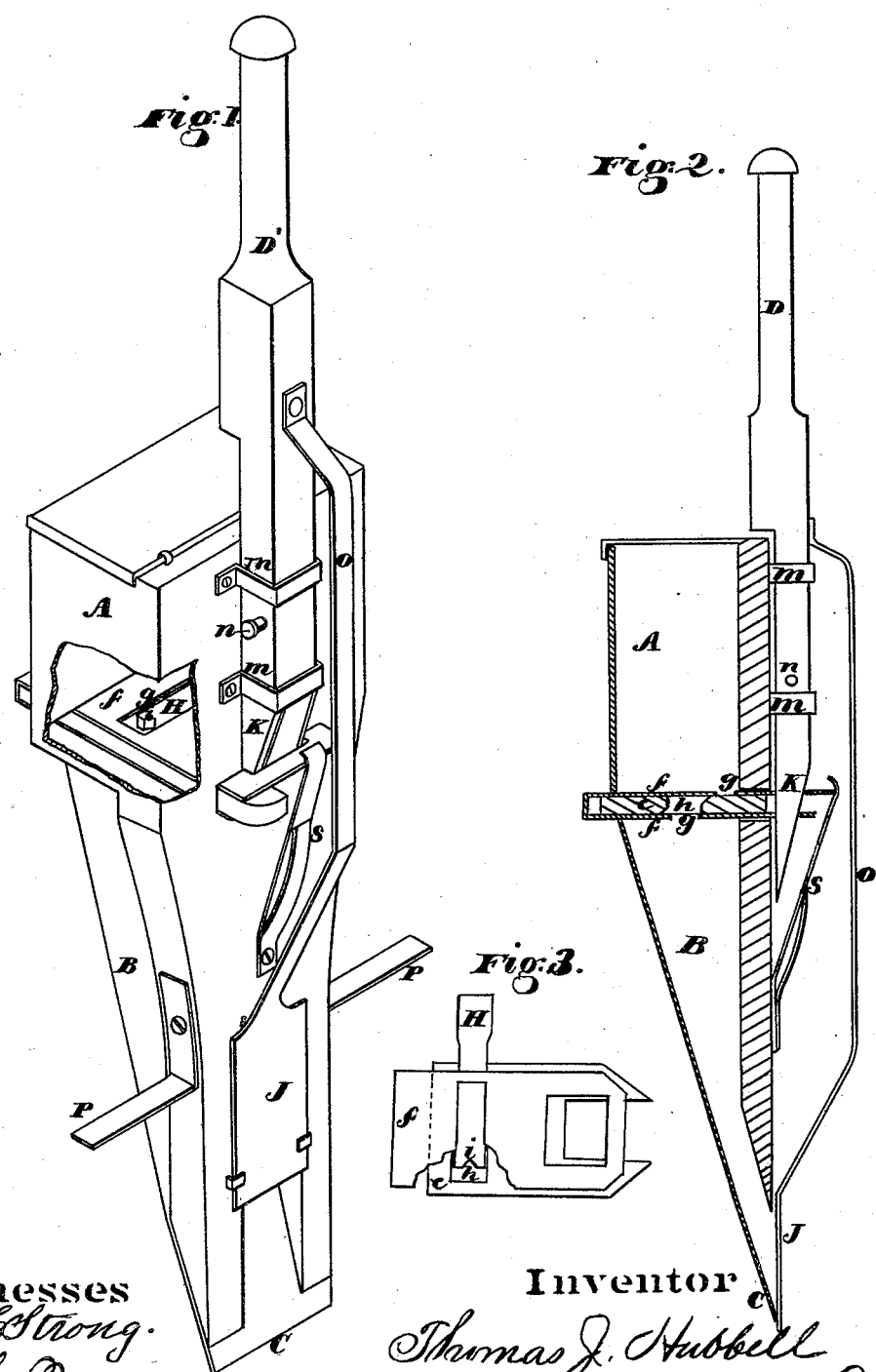

THOMAS J. HUBBELL, OF NAPA CITY, CALIFORNIA, ASSIGNOR OF ONE-HALF HIS RIGHT TO GEORGE W. CORNWELL, OF SAME PLACE.

IMPROVEMENT IN HAND SEED-PLANTERS.

Specification forming part of Letters Patent No. 170,865, dated December 7, 1875; application filed April 27, 1875.

*To all whom it may concern:*

Be it known that I, THOMAS J. HUBBELL, of Napa city and county, State of California, have invented an Improved Hand Seed-Planter; and I do hereby declare the following description and accompanying drawings are sufficient to enable any person skilled in the art or science to which it most nearly appertains to make and use my said invention or improvement without further invention or experiment.

My invention relates to certain improvements in that class of seed-planters which are carried in the hand from hill to hill, and operated by forcing the point or lower end of the planter into the ground, so as to make the necessary opening in the ground and drop the seed at the same time.

Referring to the accompanying drawing, Figure 1 is a perspective view of my planter. Fig. 2 is a sectional elevation.

A is the seed-box. B is the conducting-tube, and C the spade-point, which is stabbed into the ground to make a hole for the reception of the seed. D is the plunger handle or staff by which the planter is operated.

To drop the seed from the seed-box into the conducting-tube I use a double slide and a fixed partition, e. The slides f are composed of a plate of sheet metal, which is bent, so that one half of it will pass through the side of the seed-box and over the top of the partition e, while the other half passes along its under side. Through the partition e I make a transverse slot, h, at about the middle of the bottom of the box. The upper portion of the slide f is also slotted, at g, on one side of the slot h in the partition, while the lower part is slotted on the opposite side, so that when the slides are moved back and forth, and the slot in the upper slides comes opposite the slot in the partition, the seed will drop through the slot in the upper sliding plate, and rest upon the lower slide until its slot comes opposite the slot in the partition, when they will drop out into the conducting-tube.

A slide, H, is used for decreasing the size of the slot in the partition, in order to regulate the amount of seed to be dropped into the tube. A notch, i, is made vertically in the end of the slide H, so that when very fine seed—such as mustard-seed, lettuce-seed, and the like—are to be planted, the slide can be closed entirely across the slot in the partition, and allow the seed to pass down through the notch i.

The seeds are dropped from the conducting-tube B, or lower part of the planter, by means of a sliding plate, J, which alternately covers and uncovers an opening in the straight side of the spade-point C. This sliding plate J, as well as the slides f, is operated by the plunger-handle D in the following manner: The lower end of the handle or staff is formed into a wedge, K, and the plunger passes down the straight side of the planter through guiding-strap m m until the point of the wedge K enters a slot or loop opening in the projecting end of the slide f.

A stop, n, prevents the handle or plunger from being withdrawn far enough to prevent the point of the wedge from leaving the slot. A spring, S, forces the sliding plate back after the wedge recedes.

The sliding plate J has a handle, O, which extends upward, and has its upper end secured to the plunger or handle D, so that every time the plunger moves downward its wedge operates the slides f, so as to drop a quantity of seed into the conducting-tube; and the same movement forces the plate J over the opening in the spade-point, so as to retain the seeds in the tube until the handle rises and lifts the sliding plate J, thus allowing the seed to drop out into the hole prepared by the spade-point.

P P are stops, which gage the depth to which the point of the planter enters the ground.

This planter can be regulated to plant small or large seed with perfect uniformity, and they can be made quite light, so that they will be easily handled without extremely fatiguing the operator.

Having thus described my invention, what

I claim, and desire to secure by Letters Patent, is—

The plunger D, with its wedge-shaped end K, and having the handle O of the sliding plate attached to it, in combination with the seed-box A and conducting-tube B, having the slotted partition e, slotted slides f f, and drop-opening, all combined and arranged to operate substantially as and for the purpose described.

THOMAS J. HUBBELL.

Witnesses:
 GEO. H. STRONG,
 JNO. L. BOONE.